(12) United States Patent
Li et al.

(10) Patent No.: US 8,478,011 B2
(45) Date of Patent: Jul. 2, 2013

(54) IMAGE SEGMENTATION METHOD

(75) Inventors: Kai Li, Eugene, OR (US); Allen Davis Malony, Eugene, OR (US); Don M. Tucker, Eugene, OR (US)

(73) Assignee: Cerebral Data Systems, Inc., Eugene, OR (US)

( * ) Notice: Subject to any disclaimer, the term of this patent is extended or adjusted under 35 U.S.C. 154(b) by 930 days.

(21) Appl. No.: 12/587,225

(22) Filed: Oct. 1, 2009

(65) Prior Publication Data

US 2011/0081062 A1    Apr. 7, 2011

(51) Int. Cl.
*A61B 6/03*      (2006.01)
(52) U.S. Cl.
USPC .......................................................... 382/131
(58) Field of Classification Search
USPC ................................................ 382/128–132
See application file for complete search history.

(56) References Cited

PUBLICATIONS

Li, Neuroanatomical Segmentation in MRI Exploiting A Priori Knowledge, Jun. 2007, Doctoral Dissertation, Department of Computer and Information Science and the Graduate School of the University of Oregon, 158 pages.*
Ridgway et al., Issues with threshold masking in voxel-based morphometry of atrophied brains, available on line Sep. 20, 2008, NeuroImage, vol. 44, pp. 99-111.*
Nakib et al., Image histogram Thresholding based on multiobjective optimization, available on line Apr. 19, 2007, Signal Processing, vol. 87, pp. 2516-2534.*
Otsu, A Threshold Selection Method from Gray-level Histograms, 1979, IEEE Transactions on Systems, Man, and Cybernetics, vol. SMC-9, No. 1, pp. 62-66.*

* cited by examiner

*Primary Examiner* — Toan Ton
*Assistant Examiner* — John Corbett
(74) *Attorney, Agent, or Firm* — Portland Intellectual Property, LLC

(57) ABSTRACT

An image segmentation method. An image is defined by voxels representing at least two different structure types A and B, by having corresponding different intensities that may be subject to intensity inhomogeneities. A basic method comprises (a) selecting a first voxel to be classified; (b) defining criteria by which a comparison of the intensity associated with the first voxel with an intensity associated with a second voxel is to be considered to indicate that the first voxel represents structure type B assuming the second voxel represents structure type A; (c) determining a path of voxels passing through the first voxel; (d) defining a maximum distance along the path; and (e) determining whether there is a second voxel on the path, within the maximum distance of the first voxel, such that the intensities associated with the first and second voxels together satisfy the criteria, for potentially classifying the first voxel as representing structure type B.

15 Claims, 9 Drawing Sheets

1: for each voxel $x_i \in I$ do
2:     if $x_i \in $ ROI, $\omega_i \leftarrow \gamma$, otherwise, $\omega_i \leftarrow 0$.
3: end for
4: for each voxel $x_i \in $ ROI do
5:     if $\omega(f(x_i)) = \beta$ then
6:         $\omega_i \leftarrow \beta$
7:     else if $\frac{y'_i}{y''(f(x_i))} < t_{gw}$ then
8:         $\omega_i \leftarrow \beta$
9:     end if
10: end for
11: for each voxel $x_i \in $ ROI do
12:     if $\omega_i = \gamma \wedge \omega(f(x_i)) = \beta$, $\omega_i \leftarrow \beta$.
13: end for
14: for each voxel $x_i \in $ ROI do
15:     if $\omega_i = \gamma \wedge c(x_i)) > \frac{p'}{3}$, $\omega_i \leftarrow \beta$.
16: end for

Fig. 4

1: for each voxel $x_i \in$ ROI such that $\omega_i = \beta$ do
2:     if $|F(x_i)| > 0 \wedge \left( \dfrac{y'_i}{\sum_{x_j \in F(x_i)} \frac{y''_j}{|F(x_i)|}} \right) \leq t_{cw}, \omega_i \leftarrow \alpha$.
3: end for

Fig. 5

1: $h^* \leftarrow \infty$ { $h^*$ denotes the minimum of $h$.}
2: for each candidate $t_{gw}$ do
3:    invoke GM-WM-segmentation on $H$ with $t_{gw}$.
4:    initialize the SICV $h$ for $t_{gw}$.
5:    for each voxel $x_i \in H$ s.t. $\omega_i = \beta \wedge |F(x_i)| > 0$ do

6:      put $x_i$ in the list $L_k$, where $k = \left\lfloor \dfrac{100 \times y_i'}{t_{gm} \dfrac{\sum_{x_j \in F(x_i)} v_j''}{|F(x_i)|}} \right\rfloor$ {in case of $k > 100$,    enforce $k = 100$.}
7:    end for
8:    for $k = 0$ to $100$ do
9:      for each $x_i \in L_k$ do
10:        $\omega_i \leftarrow \alpha$, and update $h$ in terms of eq. 14.
11:      end for
12:      if $h < h^*$ then
13:        $h^* \leftarrow h$, $t_{gw}^* \leftarrow t_{gw}$, and $t_{cw}^* \leftarrow t_{gw} \frac{k}{100}$. {$t_{gw}^*$ and $t_{cw}^*$ denote the optimal relative thresholds.}
14:      end if
15:    end for
16: end for

Fig. 6

1: $s_1 \leftarrow 0$.
2: for each voxel $x_i \in H$ s.t. $\omega_i = \beta$ do
3:    if $\exists x_j (x_j \in N_i^3$ and $\omega_j = \gamma)$ then
4:       enqueue $x_i$ into queue $Q$; $s_1 \leftarrow s_1 + 1$.
5:    end if
6: end for
7: for $k = 0$ to $c^+$ do
8:    $s_2 \leftarrow 0$.
9:    while $s_1 > 0$ do
10:       $s_1 \leftarrow s_1 - 1$; dequeue $Q$ obtaining $x_i$.
11:       if $x_i$ satisfies the context conditions then
12:          determine the local threshold $t_i$.
13:          if $y_i' \geq t_i$ then
14:             $\omega_i \leftarrow \gamma$.
15:             for each $x_j \in N_i^3$ s.t. $x_j \notin Q \wedge \omega_j = \beta$ do
16:                enqueue $x_j$; $s_2 \leftarrow s_2 + 1$.
17:             end for
18:          end if
19:       end if
20:    end while
21:    $s_1 \leftarrow s_2$.
22: end for

Fig. 10

1: for $k = 0$ to $c^-$ do
2:    for each voxel $x_i \in H$ s.t. $\tilde{\omega}_i = \gamma$ do
3:       if $\exists x_j (x_j \in N_i^3$ and $\omega_j = \beta)$ then
4:          enqueue $x_i$ into queue $Q$;
5:       end if
6:    end for
7:    while $Q$ is not empty do
8:       dequeue $Q$ obtaining $x_i$.
9:       determine the local threshold $t_i$.
10:      if $y_i' < t_i$, $\omega_i \leftarrow \beta$.
11:    end while
12: end for

Fig. 11

IMAGE SEGMENTATION METHOD

GOVERNMENT RIGHTS

This invention was made with government support under W81XWH-07-2-0092 awarded by the U.S. Department of Defense. The government has certain rights in the invention.

FIELD OF THE INVENTION

The present invention relates to image segmentation or classification, particularly for use in interpreting medical images such as MRI images.

BACKGROUND

An image either is, or can be transformed into, an ordered set of pixels. Each pixel has a location in the image, i.e., relative to all other pixels in the set, and one or more values defining the pixel's intensity and color. In the case of MRI images, there is typically only one value for a pixel, and that is the pixel's intensity.

In MRI images of the brain, there are three tissue types of particular interest, namely white matter ("WM"), gray matter ("GM"), and cerebrospinal fluid ("CSF"). Setting aside the skull, the remaining three of these tissue types are distinguished in the image by their intensities: Pixels representing WM have a relatively high intensity; pixels representing GM have a relatively moderate intensity; and pixels representing CSF have a relatively low intensity.

A fundamental problem in the interpretation of images generally is that of associating pixels having similar values, to identify particular objects. In the MRI image for example, it is desired to classify a given pixel, based on its intensity alone, as representing either WM, GM, or CSF. In the aggregate, this allows the identification of structures.

It may be noted at this point that the term "pixel" refers to a quantum area and assumes a two-dimensional image. If the image is three-dimensional, the corresponding quantum volume is termed a "voxel." In the context of image segmentation, the same principles apply.

One simple type of image segmentation, referred to as "thresholding," defines a range within which the absolute pixel value can be considered to represent a given structure type. So, for example, a range of intensities (normalized between 0 and 1.0) for a pixel to be considered WM may be 0.7-1.0; a range for GM may be 0.4-0.69; and a range for CSF may be any value less than 0.39.

A well known problem with thresholding results from the fact that there are always intensity inhomogeneities ("IIH") within the image. These are necessarily spatial, but may be random or not. As a result, a first pixel representative of WM at a first location in the image may have an intensity of 0.75, whereas a second pixel representative of the same tissue type at a second location in the image may have an intensity of only 0.65. Under the thresholding scheme described above, the WM would be correctly classified at the first location, but would be incorrectly classified as GM at the second location.

There are numerous strategies for addressing this problem, two general categories of which are noteworthy for purposes herein. One of these seeks to correct for the IIH. This may be done as a pre-processing step or simultaneously with the segmentation process. The other general category of strategies for addressing the problem of IIH is known as "deformable modeling," which seeks to define the boundaries between different structures, which are more robust to IIH than are individual pixels.

All of these strategies have at least one major drawback in common, which is that they conduct optimizations (i.e., of an objective function) that, while finding local optima, do not ensure the finding of global optima. There are also a number of other disadvantages, specific to the strategies generally, and specific to particular examples thereof, that are known to persons of ordinary skill in the art. It will be readily appreciated by such persons that a new strategy is needed that is both robust to IIH and does not have this "local versus global" optimization problem.

SUMMARY

Image segmentation methods are disclosed herein.

A basic method is presented for identifying structures depicted in an image comprising voxels representing at least two different structure types A and B, a voxel representing structure type A being presumed to have a greater intensity associated therewith than an adjacent voxel representing structure type B. The method comprises (a) selecting a first voxel to be classified as being either structure type A or B, the first voxel having an intensity associated therewith; (b) defining B-A criteria by which a comparison of the intensity associated with the first voxel with an intensity associated with a second voxel is to be considered to indicate that the first voxel represents structure type B assuming the second voxel represents structure type A; (c) determining a B-A path of voxels passing through the first voxel; (d) defining a B-A maximum distance along the B-A path that is substantially less than the maximum distance allowed by the image; and (e) determining whether there is a second voxel on the B-A path, within the B-A maximum distance of the first voxel, such that the intensities associated with the first and second voxels together satisfy the B-A criteria, and if so, the method further comprises at least temporarily classifying the first voxel as representing structure type B.

Preferably, the basic method further comprises, according to the B-A criteria, comparing the intensity associated with the first voxel to the intensity associated with the second voxel so as to define a B-A relative intensity, comparing an assumed intensity for voxels representing structure type A to an assumed intensity for voxels representing structure type B so as to define a B-A relative threshold, wherein the B-A criteria are satisfied if the B-A relative intensity is less than the B-A relative threshold.

Preferably, the B-A relative threshold is determined at least in part by specifying a plurality of candidate values therefor, performing steps (a)-(e) with each of the candidates to obtain respective results, and comparing the results. Preferably one or more of the candidate values are identified that decrease the value of an objective function that is defined, at least in part, by a weighted sum of intra-class variations.

Also disclosed is an extended method extending the basic method to include an additional structure type C, wherein for any two adjacent voxels representing both structure types B and C, the intensity of the voxel representing structure type B is greater than the intensity of the voxel representing structure type C. The method comprises (f) performing steps (a)-(e) sufficient to result in (g) at least temporarily classifying a third voxel as representing the structure type B, and (h) at least temporarily classifying a plurality of voxels that have not been at least temporarily classified as representing the structure type B in step (g) as representing the structure type A; defining C-A criteria by which a comparison of the intensity associated with the third voxel with an intensity associated with a fourth voxel is to be considered to indicate that the third voxel represents structure type C assuming the fourth voxel represents structure type A; determining a C-A path of voxels passing through the third voxel; defining a C-A maximum distance along the C-A path that is substantially less than the maximum distance allowed by the image; identifying a set of one or more of the voxels of step (h), on the C-A path within the C-A maximum distance of the third voxel, the voxels of the set having respective intensities associated therewith; determining a set of comparative values, each comparative value indicating a comparison of the intensity associated with a respective one of the voxels of the set with the intensity associated with the fourth voxel; determining an average relative intensity that is, at least in part, based on the average of the comparative values; and determining whether the intensity associated with the third voxel and the average relative intensity satisfy the C-A criteria, and if so, the method further comprises at least temporarily classifying the third voxel as representing structure type C.

Preferably, the B-A path is a gradient path.

Preferably, the C-A path is a gradient path.

Preferably the extended method further comprises, according to the C-A criteria, comparing the intensity associated with the third voxel to the average intensity so as to define a C-A relative intensity, and comparing an assumed intensity for voxels representing structure type A to an assumed intensity for voxels representing structure type C so as to define a C-A relative threshold, wherein the C-A criteria are satisfied if the C-A relative intensity is less than the C-A relative threshold.

A further extended method includes efficient searching to find optimum relative thresholds. A preferred such method comprises specifying a plurality of candidate B-A criteria by which a comparison of the intensity associated with said first voxel with an intensity associated with a second voxel is to be considered to indicate that the first voxel represents structure type B assuming the second voxel represents structure type A; performing the following steps (a)-(d) with each of said candidate values to obtain corresponding threshold-search voxels that are at least temporarily classified as representing structure type B: (a) selecting a first voxel to be classified as being either structure type A or B, said first voxel having an intensity associated therewith, (c) determining a B-A path of voxels passing through said first voxel, (d) defining a B-A maximum distance along said B-A path that is substantially less than the maximum distance allowed by the image, and (e) determining whether there is a second voxel on said B-A path, within said B-A maximum distance of said first voxel, such that the intensities associated with said first and second voxels together satisfy said B-A criteria, and if so, the method further comprises at least temporarily classifying said first voxel as representing structure type B; defining C-A criteria by which a comparison of the intensity associated with said third voxel with an intensity associated with a fourth voxel is to be considered to indicate that the third voxel represents structure type C assuming the fourth voxel represents structure type A; performing the following steps (f)-(i) for each of the C-A criteria: (f) determining a C-A path of voxels passing through said third voxel, (g) defining a C-A maximum distance along said C-A path that is substantially less than the maximum distance allowed by the image, (h) identifying a set of one or more of the threshold-search voxels, on said C-A path within said C-A maximum distance of said third voxel, the voxels of said set having respective intensities associated therewith, (h) determining a set of comparative values, each comparative value indicating a comparison of the intensity associated with a respective one of the voxels of said set with the intensity associated with said fourth voxel, and (i) determining an average relative intensity that is, at least in part, based on the average of said comparative values; forming a plurality of lists of the threshold search voxels, each list corresponding to a unique predetermined range of the average relative intensities obtained in steps (i); defining an objective function for the structure types A, B, and C; and re-classifying the voxels in said lists from structure type B to structure type C so as to lower-the value of said objective function.

Also disclosed are methods for denoising, in an image, a measured value associated with a voxel at a selected central location, by reference to corresponding measured values associated with voxels at locations surrounding the central location.

A basic denoising method comprises defining, in a first plane, a first region containing a predetermined number of the voxels at the surrounding locations; identifying pairs of the voxels at the surrounding locations, each pair containing respective first and second surrounding voxels; defining, for each the pair, an angle between (a) a first line passing through the central voxel and the first surrounding voxel, and (b) a second line passing through the central voxel and the second surrounding voxel; selecting at least one of the pairs, at least in part, as a result of the angle corresponding thereto exceeding a predetermined threshold; averaging at least the intensity of the first and second voxel in the selected at least one of the pairs; and obtaining a denoised value associated with the voxel at the central location based, at least in part, on the result of the step of averaging.

Preferably, the step of selecting is limited to selecting only one of the pairs, and the step of averaging averages the first and second voxel in the selected one of the pairs along with the intensity of the voxel at the central location.

In one specific embodiment of the basic denoising methodology, the method preferably further comprises selecting the at least one of the pairs, at least in part, as a result of the measured values associated with the first and second voxels therein being closer to the measured value associated with the voxel at the central location than measured values associated with the first and second voxels contained in other the pairs.

In another specific embodiment of the basic denoising methodology, the method preferably further comprises selecting the at least one of the pairs, at least in part, as a result of the measured values associated with the first and second voxels therein providing for an average measured value that is greater in comparison to the corresponding averaged measured values associated with the first and second voxels contained in other the pairs.

Also disclosed are adaptive thresholding methods, for identifying structures depicted in an image comprising voxels representing two different structure types A and B, a voxel representing structure type A being presumed to have a greater intensity associated therewith than an adjacent voxel representing structure type B. In a basic "A growing" embodiment, the method comprises (a) identifying a B voxel currently recognized as representing the structure type B that is adjacent an A voxel currently recognized as representing the structure type A; (b) defining a first local region of voxels surrounding the B voxel; (c) determining an A-B threshold first candidate value that decreases, on the first local region, the value of an objective function that is defined, at least in part, by a weighted sum of intra-class variations; and (d) at least tentatively recognizing the B voxel as an A voxel if the intensity of the B voxel is greater than the first candidate value.

Preferably, step (c) further comprises determining an A-B threshold second candidate value determined on the first local region by an Otsu threshold generation method, and wherein the recognition of step (d) is conditioned on the first candidate value being less than the second candidate value, otherwise step (h) comprises recognizing the A voxel as a B voxel if the intensity of the A voxel is greater than the second candidate value.

Preferably, any of the A growing thresholding methods further comprise defining a first limited region of voxels surrounding the B voxel, and wherein step (d) further requires, for the recognizing, that the number of A voxels in the first limited region exceed a predetermined minimum.

Preferably, for any of the A growing adaptive thresholding methods, the first limited region is smaller than the first local region, and step (d) further requires, for the recognizing, that the number of B voxels in the first limited region exceeds a predetermined minimum.

Preferably, any of the A growing adaptive thresholding methods further comprise defining a second limited region of voxels surrounding the B voxel, wherein the second limited region is smaller than the first limited region, and wherein step (d) further requires, for the recognizing, that the number of A voxels in the second limited region exceeds a predetermined minimum.

Preferably, any of the A growing adaptive thresholding methods are iterated at least 10 times.

Preferably, any of the A growing adaptive thresholding methods are supplemented with one or more B growing adaptive thresholding methods, performed thereafter, where the A and B voxels define a portion of a first boundary between voxels that were recognized as representing structure type A and voxels that were recognized as representing structure type B, and wherein, if as a result of step (d), the B voxel becomes currently recognized as an A voxel, so that the first boundary is transformed into a second boundary that is displaced at least in part from the first boundary. A basic GM growing method comprises (e) identifying an A voxel adjacent the second boundary that is currently recognized as representing the structure type A; (f) defining a second local region of voxels surrounding the A voxel; (g) determining a B-A threshold first candidate value that decreases, on the second local region, the value of an objective function that is defined, at least in part, by a weighted sum of intra-class variations; and (h) at least tentatively recognizing the A voxel as a B voxel if the intensity of the A voxel is less than the first candidate value.

Preferably, step (c) further comprises determining an A-B threshold second candidate value determined on the first local region by an Otsu threshold generation method, and wherein the recognition of step (d) is conditioned on the first candidate value being less than the second candidate value, otherwise the method comprises recognizing the A voxel as a B voxel if the intensity of the A voxel is greater than the second candidate value.

Preferably, steps (e)-(h) are performed only after steps (a)-(d) are iterated at least 10 times.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF THE DRAWINGS

FIG. 4 is a listing of pseudo-code representing an algorithm for implementing, in the system of FIG. 1, a first stage of a preferred methodology for image segmentation between three structure types, according to the invention.

FIG. 5 is a listing of pseudo-code representing an algorithm for implementing, in the system of FIG. 1, a second stage of the methodology referred to in connection with FIG. 3.

FIG. 6 is a listing of pseudo-code representing an algorithm for implementing, in the system of FIG. 1, a methodology for optimum relative thresholding searching according to the invention.

FIG. 10 is a listing of pseudo-code representing an algorithm for implementing, in the system of FIG. 1, a preferred first stage adaptive thresholding methodology according to the invention, for growing WM structure.

FIG. 11 is a listing of pseudo-code representing an algorithm for implementing, in the system of FIG. 1, a preferred second stage adaptive thresholding methodology according to the invention, for growing GM structure.

DETAILED DESCRIPTION OF PREFERRED EMBODIMENTS

Figure 1:
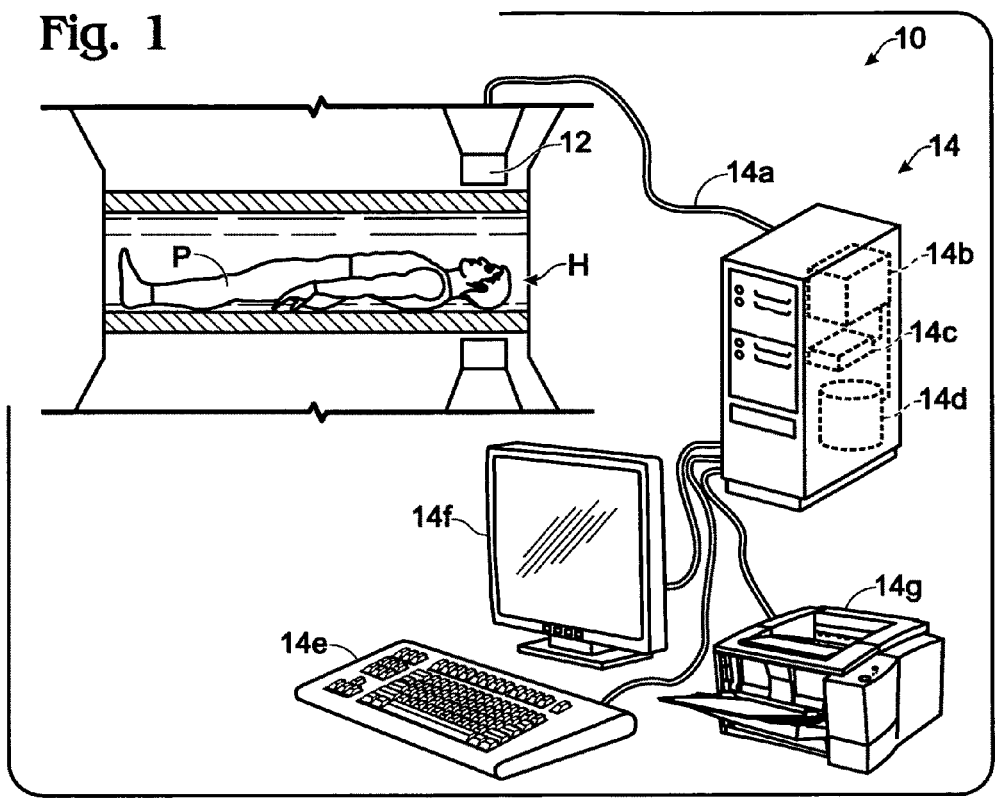
FIG. 1 is a schematic representation of a system for implementing an image segmentation method according to the present invention.

FIG. 1 shows a system 10 for implementing an image segmentation method according to the present invention. The system 10 includes an MRI imaging apparatus 12, here shown ready for imaging the head region "H" of a person "P," and a general purpose computer 14 that is programmed, in addition to performing methodologies described hereinbelow, to receive image data from the apparatus 12. The computer 14 is typically, though it need not be, provided as part of the apparatus 12. It will be understood that, while described in the context of MRI images, and more particularly MRI images of the brain, a context in which the invention is particularly advantageous, its principles are applicable to any type of image, and no loss of generality is implied by the MRI, brain image example. It will also be understood that pixels can be generalized to voxels and vice versa; hereinafter, the term voxel is considered to be generic.

As is standard in the art, the computer 14 is preferably a general purpose computer, such as a PC or an Apple Macintosh, but it may be specially adapted for use with the apparatus 12. In any case, the computer 14 generally has a data bus 14a over which the image data are received from the MRI apparatus 12 into the computer, a processor 14b for executing instructions such as those described herein, a working memory 14c (RAM), and a nonvolatile storage memory 14d for storing the image data. The computer also generally has a keyboard 14e to allow for operator interaction with the computer, and a display 14f for the operator to view segmented images produced as described herein. A printer 14g is typically also provided for printing the segmented images.

Figure 2:
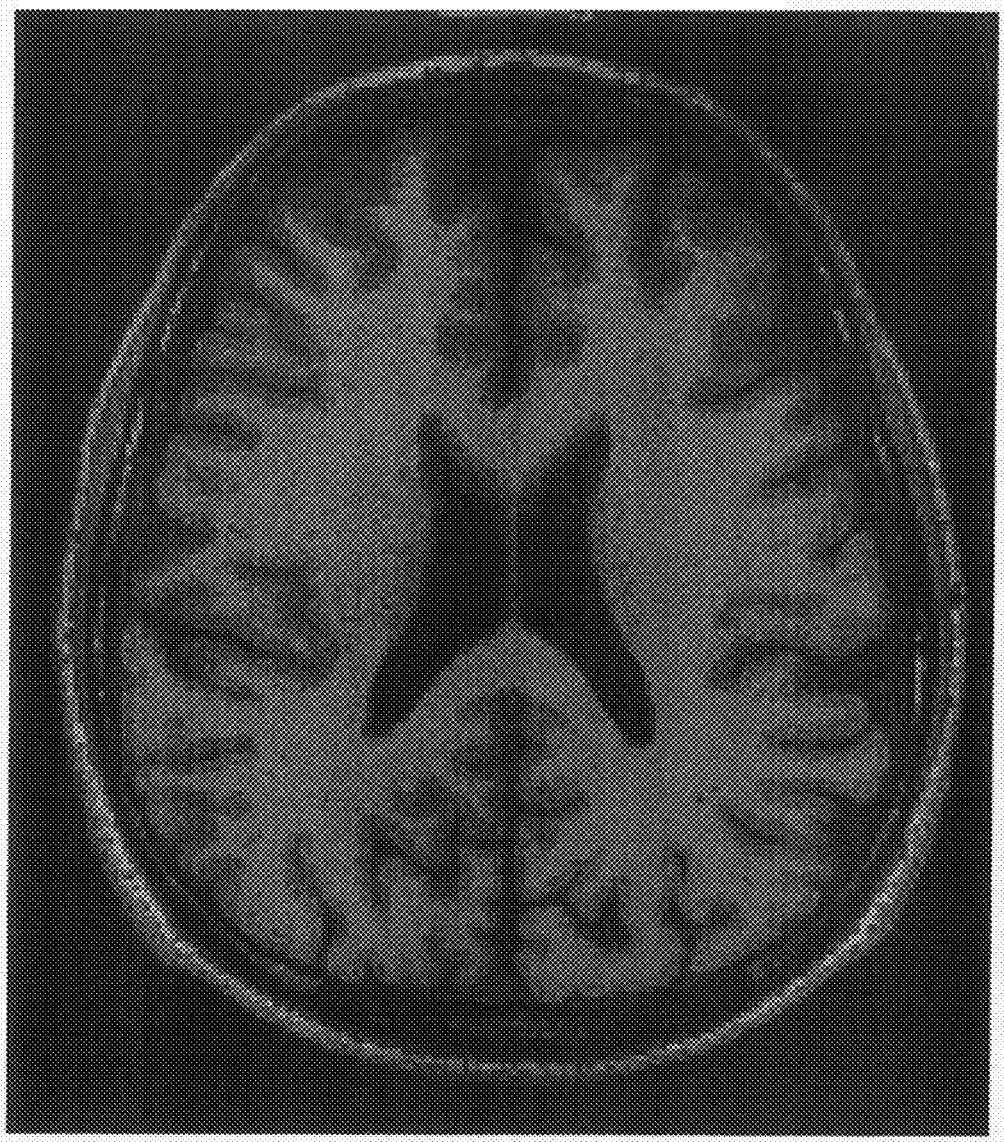
FIG. 2 is a two-dimensional slice of an MRI brain scan image.
Figure 3:
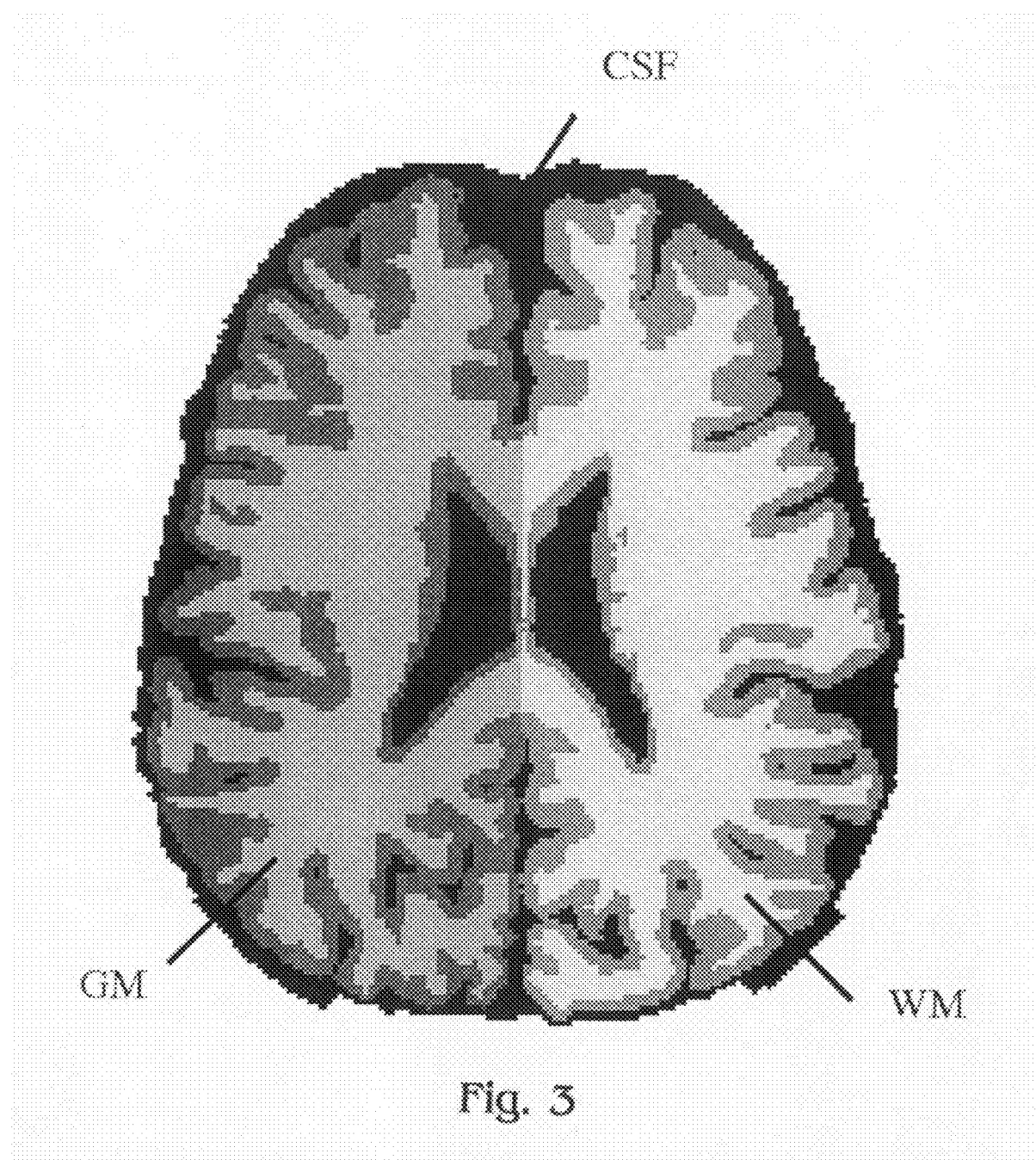
FIG. 3 is a segmented image derived from the image of FIG. 2, such as may be generated by the system of FIG. 1.

FIG. 2 is an actual MRI brain scan image, showing the three structure types WM, GM, and CSF (not identified on the image). The scan is formed of voxels of varying intensities. The goal is to identify, by these intensities, which voxels represent WM, which voxels represent GM, and which voxels represent CSF. A typical result of the methodologies described herein is shown in FIG. 3, which is a segmented image generated by the system 10, in which the WM, GM, and CSF regions are identified (compare with FIG. 2).

Definitions

Some definitions for use herein are as follows:

WM="white matter" (having a relatively high intensity value).

GM="gray matter" (having a relatively moderate intensity value).

CSF="cerebrospinal fluid" (having a relatively low intensity value).

$x_i$=current voxel, i.e., the voxel it is desired to classify.

$x_j$=reference voxel (aka "gradient neighbor" of $x_i$, aka $g_i$).

$\nabla$=gradient (preferably Gaussian) of intensities at the scale $\sigma_\nabla$ of the image. It has been found that for MRI images of the human brain, a good value of $\sigma_\nabla$ is 2 mm (for comparison, the dimension of a voxel is approximately 1 mm).

$P_i$=gradient path, defined by $\nabla$, passing through the voxel $x_i$. The gradient path is established by the gradient defined at each voxel along the path.

$P_{i-j}$=gradient path, defined by $\nabla$, between $x_i$ and $x_j$.

p=the maximum distance along $P_{i-j}$ for which $x_i$ can be classified CSF when $x_j$ is classified WM. It has been found that for MRI images of the brain, a good value of p is 24 mm.

p'=the maximum distance along $P_{i-j}$ for which $x_i$ can be classified GM when $x_j$ is classified WM. It has been found that for MRI images of the brain, a good value of p' is 12 mm.

$y_i$=intensity for voxel $x_i$.

$b_i$=bias field at voxel $x_i$.

$p_i$=noise field at voxel $x_i$.

$y'_i$=denoised intensity for voxel $x_i$.

$y''_i$=denoised intensity for voxel $x_i$, particularly using a denoising filter providing for a deeper level of denoising than used for $y'_i$.

$y'_i/y_j$=relative denoised intensities of voxels $x_i$ and $x_j$. Denoising will be discussed further below.

$t_{CSF-WM}=t_{cw}$=CSF-WM relative threshold (relative threshold for distinguishing CSF and WM).

$t_{GM-WM}=t_{gw}$=GM-WM relative threshold (relative threshold for distinguishing GM and WM).

$t_{GM-WM\ absolute}$=absolute threshold for flipping GM to WM.

$t_{WM-GM\ absolute}$=absolute threshold for flipping WM to GM.

$\omega_i$=determined (or otherwise specified) structure type indicia for the voxel $x_i$.

$\gamma$=value of the indicia $\omega_i$ where the voxel $x_i$ is, or is considered to be, WM.

$\beta$=value of the indicia $\omega_i$ where the voxel $x_i$ is, or is considered to be, GM.

$\alpha$=value of the indicia $\omega_i$ where the voxel $x_i$ is, or is considered to be, CSF.

$z_i$=ideal intensity for voxel $x_i$ $z_{bar}^k$=average of the ideal intensities of voxels corresponding to tissue type "k" over the image, where k in this case is either $\alpha$, $\beta$, or $\gamma$.

$f(x_i)$=voxel with the greatest denoised intensity $y''(f(x_i))$ within distance p' from the voxel $x_i$ along $P_i$.

$\omega(f(x_i))$=structure type indicia for the voxel $f(x_i)$.

$y''(f(x_i))$=a denoised intensity for the voxel $f(x_i)$.

$F(x_i)$=a set of the first three (or fewer if there are not three) recognized WM voxels within a range p from the voxel $x_i$ along $P_i$.

$|F(x_i)|$=the number of voxels in the set $F(x_i)$.

SICV="sum of intra-class variations."

ROI="region of interest"

$N_i^3$=3×3×3 voxel region centered on voxel i.

$N_i^5$=5×5×5 voxel region centered on voxel i.

$N_i^7$=7×7×7 voxel region centered on voxel i, aka "local region"

Relative Thresholding

A General Rule

The following is a general relative thresholding rule for classifying a given voxel $x_i$ as being one of the three tissue types CSF, GM, and WM according to the invention:

If there exists a $P_{i-j}$ that is less than (or equal to) p, for which $y_i/y_j$ is less than (or equal to) $t_{CSF-WM}$, then $x_i$ is assumed to be CSF.

Otherwise, if there exists a $P_{i-j}$ that is less than (or equal to) p', for which $y_i/y_j$ is less than (or equal to) $t_{GM-WM}$, then $x_i$ is assumed to be GM.

Otherwise, $x_i$ is assumed to be WM.

This rule provides for comparing the value(s) of a voxel in question with that (those) of a reference voxel. It is not essential to have classified the reference voxel, or to make any assumptions about the structure the reference voxel represents. However, as an example of how the rule may be implemented, consider a reference voxel that has already been classified as WM (white matter). It is desired to assess whether a relatively nearby voxel under consideration also represents WM, or represents something different, either CSF or GM. It is conservatively assumed, as a default, that the voxel represents WM unless there is sufficient reason to believe otherwise.

There may be two such reasons. First, if the denoised intensity ratio is a sufficiently small number (e.g., 0.2), then the assumption is made that the voxel under consideration represents the darkest matter, CSF. Second, if the denoised intensity ratio is not a very small number, but it is also not a very large number (e.g., 0.6), then the assumption is made that the voxel under consideration represents matter of intermediate intensity, i.e., gray matter.

Preferably, an initial assumption is made that all matter is WM, and according to the rule, the indicia may be "flipped" from WM to either CSF or GM.

Theoretically, a good value for the CSF-WM relative threshold $t_{cw}$ is the average of $z_{bar}^\alpha/z_{bar}^\gamma$ and $z_{bar}^\beta/z_{bar}^\gamma$, and a good value for the GM-WM relative threshold $t_{gw}$ is the average of $z_{bar}^\beta/z_{bar}^\gamma$ and 1.0. However, since the values of the $z_{bar}$ variables are not known, the invention provides for determining optimum relative thresholds as explained below.

It should be understood that the labels $\alpha$, $\beta$, and $\gamma$ are arbitrarily chosen, and therefore are interchangeable (with suitable adjustments being made in the relative thresholds to account for the inherent intensity differences).

Preferred Relative Thresholding

A preferred relative thresholding methodology based on the general rule is implemented in two stages, for a reason discussed further below. FIGS. 4 and 5 show algorithms for implementing, in the computer 14, the two stages. The methodology is generally performed on an image, and more specifically, it is typically performed on a "region of interest" ("ROI") within the image. It is assumed that the ROI contains at least the three structure types that it is desired to classify.

In the first stage (FIG. 4), the ROI is segmented between WM and, temporarily, GM. Lines 1-3 initialize all voxels in the ROI to WM.

Lines 4-10 perform the relative thresholding methodology described above, where the f(x$_i$) is chosen as the voxel with the greatest denoised intensity y"(f(x$_i$) within distance p' along the gradient path. It should be understood that the gradient path is established by gradients defined for each voxel along the path, starting with the current voxel x$_i$ that is under consideration for classification, and ending with the reference voxel x$_j$.

The f(x$_i$) can be determined for all x$_i$ prior to invoking GM-WM segmentation.

As a result of the methodology of lines 4-10, the structure type indicia ω$_i$ will "flip" from WM to GM for all GM voxels (all voxels for which the relative intensities are substantially less than unity). In addition, the indicia should flip for all CSF voxels as well, since any voxel meeting the GM-WM relative threshold should also meet the CSF-WM threshold (which is lower). However, it is possible that, for some CSF voxels, the indicia remain at the default WM, and two additional loops, i.e., lines 11-13 and lines 14-16, are therefore preferably provided to flip the indicia for any such CSF voxels.

In the second stage (FIG. 5), the voxels for which the indicia have been flipped to GM are segmented again relative to CSF.

In line 2, if there is at least one voxel in the set F(x$_i$), and if the ratio of the denoised intensity for the voxel x$_i$ to the average of the denoised intensities for the voxels in the set F(x$_i$) is less than the CSF-WM relative threshold, then the indicia for the voxel x$_i$ is flipped from GM to CSF. Note that the second stage relative threshold, t$_{cw}$, utilizes the distance p, as compared to the first stage relative threshold, t$_{gw}$, which uses the distance p', as defined above.

Alternatively, the first stage could be a GM-CSF segmentation (initializing to GM), and the second stage a GM-WM segmentation. However, this is not preferred because it fails to take advantage of the anatomical fact that the GM structure is relatively thin, so that the gradient paths between CSF and WM are not very long. If all matter is not initialized to WM, these paths will generally be longer, and longer paths are undesirable because they are more susceptible to IIH.

Determining the Relative Thresholds

The methodology detailed in FIGS. 4 and 5 assumes possession of the relative threshold values CSF-WM and GM-WM. These are not known, and it is desirable to optimize them. A set of candidate pairs of relative thresholds (CSF-WM, GM-WM) is tried on the ROI, the resulting segmentation is evaluated for every pair, and the pair that produces the best performance is chosen as the optimum. There are three considerations in carrying out this optimization: (1) how to determine the ROI; (2) how to evaluate performance; and (3) how to minimize the computation time required to carry out the optimization, because a naive approach to exhaustive searching would be extremely time consuming.

Determining ROI

The ROI in the context of this example is preferably the brain volume, comprising WM, GM, and CSF. However, it is easier, and it is also believed to be sufficient, to extract a "head volume" ("H"), in which a majority of the head tissue including the brain volume is contained, with a majority of the background removed. A simple thresholding is first performed on the image taking as the foreground all voxels with intensity greater than a threshold t$_f$. To determine t$_f$, a four-level Otsu thresholding generating three thresholds is performed, and the smallest one is taken as t$_f$. The Otsu method is known in the art, and described in N. Otsu, "A thresholding selection method from gray-level histogram," *IEEE transactions on systems, man, and cybernetics*, vol. 9, no. 1, pp 62-66, 1979, incorporated by reference herein in its entirety.

It has been found that this method is robust for removing background (air) regions, but may trim off a substantial amount of CSF in some datasets. To recover those regions, a sequence of morphological and component analysis operations are performed on H. First, a morphological dilation is applied on H, to a desired level. Second, the holes (background components that are completely surrounded by the foreground) inside the dilated H are filled. Finally, a morphological erosion is applied on H to the same level as that of the dilation.

Evaluating Performance

The objective function for evaluating the segmentation on H is defined as the weighted sum of intra-class variations ("SICV") for the three structure types (WM, GM, and CSF), as follows:

$$h = w_\alpha h_\alpha + w_\beta h_\beta + w_\gamma h_\gamma \quad \text{(equation 1)}$$

$$h_\alpha = \sum_{w_i = \alpha} \delta_i |y'_i - y'(g_i)|$$

$$h_\beta = \sum_{w_i = \beta} \delta_i |y'_i - y'(g_i)|$$

$$h_\gamma = \sum_{w_i = \gamma} \delta_i |y'_i - y'(g_i)|$$

$$\delta_i = \begin{cases} 1 & \text{if } \omega_i = \omega(g_i) \\ 0 & \text{otherwise} \end{cases}$$

The sum of intra-class variations for each tissue type is defined as the sum of the absolute difference of the voxel (denoised) intensity and that of its gradient neighbor (g$_i$) such that both are labeled with the structure type in question. Minimization of the sum of intra-class variations corresponds to the maximization of the sum of inter-class variations, i.e., optimal relative thresholds produce segmentation such that structure boundaries match the salient image edges.

Minimization of the objective function h on the region H has been shown to produce satisfactory segmentation performance on the brain volume, because the brain volume dominates the relative thresholds searching, because the relative thresholds are structured for the brain volume, and because the brain volume occupies a substantial amount of space in the head volume, and there are a significant number of edges in the brain volume due to brain convolution.

In practice, good results are obtained by setting w$_\gamma$=2.3, and w$_\alpha$=ω$_\beta$=1.0. Factor w$_\gamma$ is greater than w$_\beta$ because intra-class variation is more severe in GM than in WM, particularly in the sulci where the CSF is so thin that the voxel intensities are blurred due to the partial volume effect. Setting w$_\gamma$ greater than w$_\alpha$ accommodates the greater extent of intra-class variations in CSF.

Optimum Relative Threshold Searching

As indicated above, optimum relative thresholds are preferably found according to the invention by a "try and evaluate" methodology. If there are "r" candidates for t$_{gw}$ and "s" candidates for t$_{cw}$, then the lengthy relative thresholding procedure would need to be performed (r×s) times to try all combinations. According to the invention, a more intelligent searching strategy is provided, that reduces the number of trials to r.

FIG. 6 shows an algorithm for implementing a methodology for relative threshold searching utilizing this strategy in the computer 14. In line 3, the first stage relative thresholding, GM-WM segmentation, shown in FIG. 4 is performed with each of the r candidates t$_{gw}$. Lines 4-7 form a list of the voxels that have been labeled as GM, "classified" according to their relative intensities for the stage two, CSF-GM segmentation (which is not actually performed) shown in FIG. 5. Preferably, there are 100 lists $L_{k=1, 2, \ldots, 100}$. The lists are equivalent to the bins in a histogram, with each bin representing 1/100 of the range of possible relative intensities, 0-1.0. Then, in lines 8-16, efficient searching for the optimal relative thresholds ($t^*_{gw}$ and $t^*_{cw}$) is accomplished by iteratively stepping through the lists with label (or indicia) flipping from GM to CSF for individual voxels, and update of the objective function (equation 1).

Denoising

A good denoising capability can be important for effective relative thresholding, as well as threshold searching. Two novel denoising filters are disclosed for this purpose, however it should be understood that any desired denoising apparatus or method may be employed, and that denoising, while important for achieving good results, is not essential.

The first preferred denoising filter is denoted $d^c(y)$, to produce the denoised intensity $y'_i$, referred to above in connection with relative thresholding. The filter $d^c(y)$ is of a class of filters known as "adaptive smoothing" filters.

Figure 7:
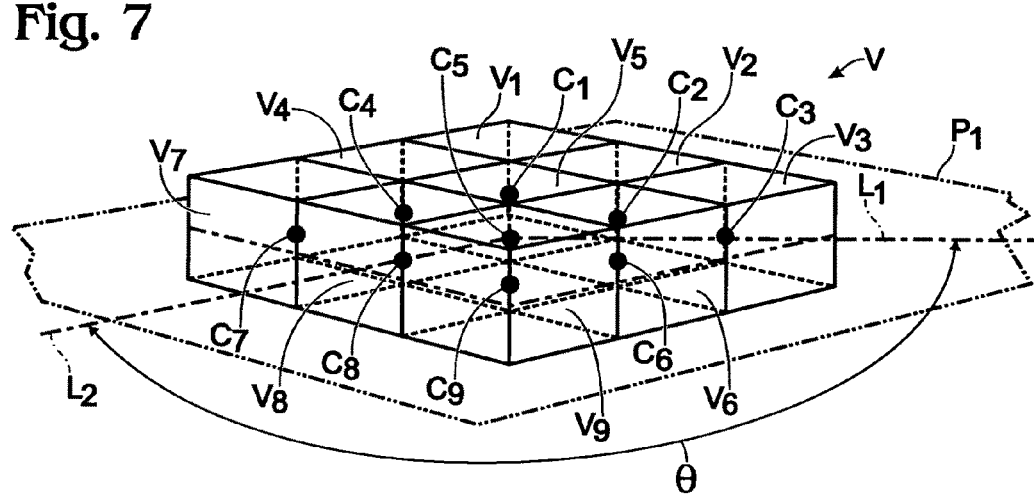
FIG. 7 is a schematic perspective representation of a plane passing through the centers of 9 voxels, illustrating a method for denoising according to the present invention.

The filter $d^c(y)$ preferably smooths by averaging data in 3 mutually orthogonal planes, but it can also average data in just one or two of these planes, and its method of operation can best be illustrated by considering the case of averaging in one plane. Particularly, FIG. 7 shows a plane "$P_1$" passing through voxels $V_1, V_2, \ldots V_9$ of 9 voxels "V" defining a 3×3 square cellular or lattice structure. More particularly, the plane $P_1$ passes through respective centers of the voxels V, at $C_1$, $C_2, \ldots C_9$. It is desired to obtain a filtered image data point $Q_1$ (not shown) corresponding to the central voxel $V_5$ and the plane $P_1$.

One way to obtain the data point $Q_1$ would be to replace the intensity value of the voxel $V_5$ with the average of the intensities for the 8 surrounding voxels. Preferably, however, only two voxels are utilized, along with the central voxel, to obtain a smoothed intensity corresponding to the plane $P_1$, and the two voxels are selected according to two rules as follows.

The first rule is that the angle "θ" defined by (a) a line "$L_1$" passing through the center of the central voxel and one of the two voxels to be averaged (here $V_3$), and (b) a line "$L_2$" passing through the center of the central voxel and the other of the two voxels to be averaged (here $V_8$), must be greater than 90 degrees. Thus, for example, $V_1$ and $V_8$, $V_2$ and $V_8$, and $V_3$ and $V_8$ are allowed pairs, whereas $V_4$ and $V_8$, $V_6$ and $V_8$, and $V_7$ and $V_8$ are not.

The second rule is that the intensities associated with the two selected voxels are as close as possible to that of the central voxel $V_5$. By application of the two rules, a pair of voxels "$PR_1$" is identified, in this case consisting of the voxels $V_3$ and $V_8$. The intensity values for each of these voxels is averaged, along with the intensity associated with the central voxel $V_5$, to obtain the filtered image data point $Q_1$.

The rules can, of course, be applied in any order.

Figure 8:
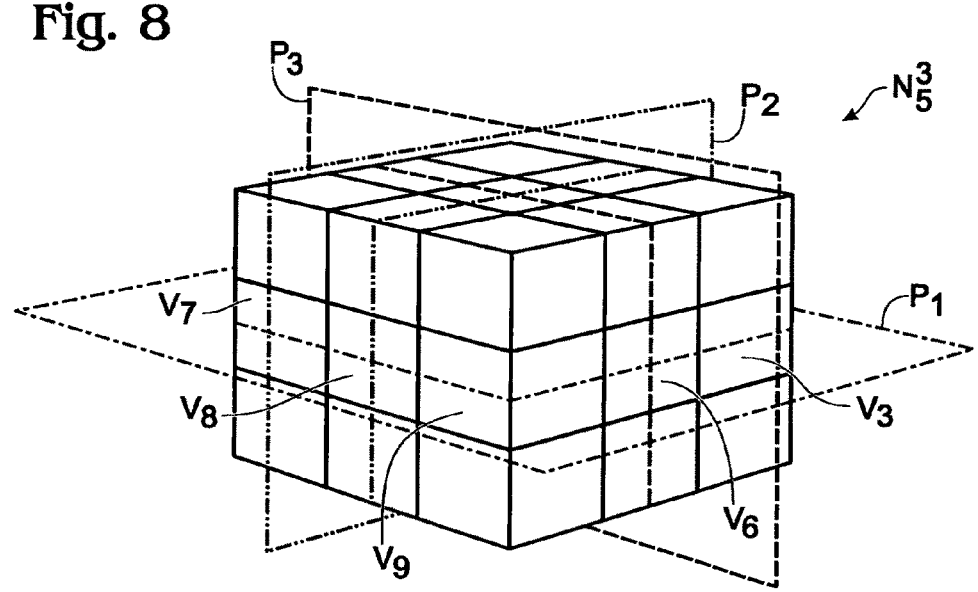
FIG. 8 is a schematic perspective representation of a region of 27 voxels, including the 9 voxels of FIG. 7, shown with three mutually orthogonal planes including the plane of FIG. 7.

According to operation of the two rules, the point $Q_1$ is obtained for the plane $P_1$. In three dimensions, there are two additional planes $P_2$ and $P_3$ (not shown), where $P_{1-3}$ are mutually orthogonal, centered on the voxel $V_5$ defining a three dimensional region "$N_5^3$" of 3×3×3=27 voxels (FIG. 8). The same methodology is applied separately in each of the planes $P_2$ and $P_3$ to obtain associated filtered image data points $Q_2$ and $Q_3$ (not shown). Finally, considering the three filtered image data points $Q_1$, $Q_2$, and $Q_3$, the filtered image data point that is the closest to the intensity value of the central voxel $V_5$ is preferably selected as the final filtered image data point $Q^*$ (not shown) corresponding to the central voxel $V_5$.

As mentioned above, it is not essential to use more than one of the three data points, and it is also not essential to determine $Q^*$ in the manner just described. For example, $Q^*$ could be obtained by averaging $Q_1$, $Q_2$, and/or $Q_3$.

Preferably, the filter $d^c(y)$ as described above is applied four times in succession.

As will be readily apparent to persons of ordinary skill, deviations to the method are possible, such as increasing the number of voxels in the region $R^3$, and increasing the number of being voxels averaged, and the methodology may be modified by including additional filtering steps as desired.

A second novel denoising filter of the same general type is denoted $d^m(y)$, is preferably used to produce the deeper level denoised intensity $y''_i$, also referred to above in connection with relative thresholding. The filter $d^m(y)$ is preferred where it is not required to maintain image edges, and is the same as the filter $d^c(y)$ except that the second rule is modified such that the two selected voxels are those that produce the maximum average intensity. Preferably, the filter $d^m(y)$ is applied twice in succession.

Image Modeling and Structure Modeling

The relative thresholding methodology described above is based on some assumptions about the image ("image modeling"), and the structure being imaged ("structure modeling").

The image modeling assumption is that:

$$y_i = b_i z_i + p_i,$$

That is, the image is modeled such that, for every voxel, there is a meaured intensity y that is the sum of (a) a bias field b that multiplies the ideal intensity signal z, and (b) an additive noise field. The first term (a) represents the IIH referred to above. It is minimized as a result of comparing voxels that are relatively close together; hence, the maximum limits on p and p'. The second term (b) is minimized by denoising.

The structure modeling assumptions are (1) that CSF, GM, and WM form a layered structure, like a golf ball; (2) the average intensities of CSF, GM, and WM in local regions are in ascending order in T1-weighted MRI; and (3) the cortex (GM) thickness is nearly uniform and is small relative to WM. Regarding this last assumption, it is fortuitous that p and p' can both be small enough to minimize IIH, yet also large enough to establish grounds for label flipping between GM and one of the other structures.

The performance of relative thresholding is to some extent dependent on the validity of these assumptions. For example, if the relative thresholding is performed on images of structures other than brains, different structure modeling assumptions may be needed.

The image assumptions have been found to be generally very good, but there are situtations in which the IIH is severe, and/or where the voxel intensities are influenced by partial volume effects, particularly for thin WM structures, and in such situations it may be desirable to augment the relative thresholding procedure with an additional "adaptive thresholding" procedure as described immediately below.

Adaptive Thresholding

Basically, adaptive thresholding performs ordinary thresholding on the results of relative thresholding, within local regions over which IIH will be small. Adaptive thresholding preferably employs two stages, namely a WM growing stage followed by a GM growing stage.

Figure 9:
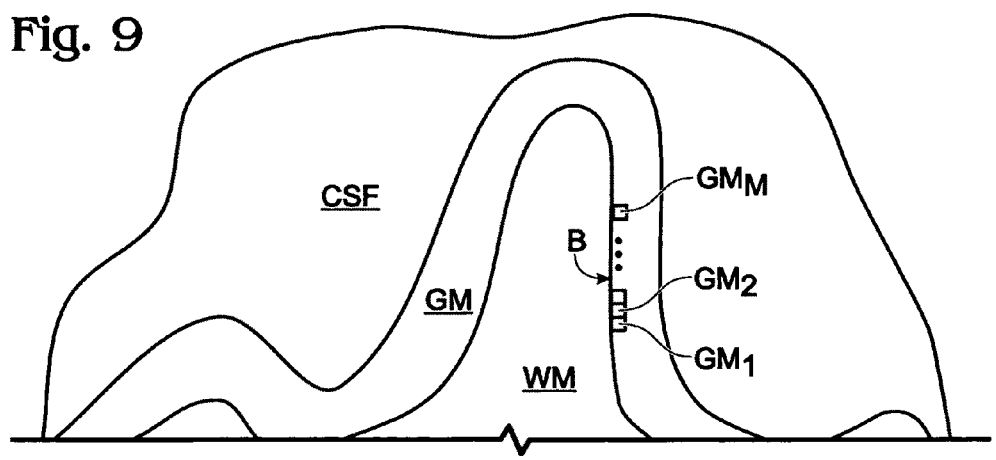
FIG. 9 is a schematic representation of a segmented image derived from a two-dimensional slice of an MRI brain scan image such as that of FIG. 2, for illustrating an adaptive thresholding methodology according to the invention.

Referring to FIG. 9, an initial segmentation has been performed with the result that WM, GM, and CSF regions are identified as shown. Preferably, the initial segmentation is accomplished by relative thresholding such as described above, but this is not essential.

GM voxels $GM_1, GM_2, \ldots GM_M$ are shown at the boundary ("B") between GM structure and WM structure. According to the invention, the WM region is grown by flipping a GM voxel under consideration if the intensity of the voxel is greater than an absolute threshold value "$t_{GM\text{-}WM\ absolute}$," and if some additional constraints are satisfied. The invention provides for determining $t_{GM\text{-}WM\ absolute}$ as follows.

The absolute threshold $t_{GM\text{-}WM\ absolute}$ is preferably selected as being the lesser of two candidate threshold values $t_1$ and $t_2$. The candidate $t_1$ is determined by the well known Otsu method noted above in connection with the determination of the ROI. The candidate $t_2$ is determined by minimizing an SICV objective function defined as follows:

$$h = w'_\beta h_\beta + w'_\gamma h_\gamma \quad \text{(equation 2)}$$

Equation 2 is essentially the same as equation 1 defined above in connection with threshold searching, except that the CSF component $w_\alpha h_\alpha$ is omitted.

Each $GM_{i=1-M}$ defines a region $N_i^3$, centered thereon, such as the region $N_5^3$ described above in connection with the two preferred denoising filters for the voxel $V_5$ (the regions $N_i^3$ are not shown). Further, Each $GM_i$ defines an analogous 5×5×5 region $N_i^5$ (also not shown), as well as a 7×7×7 region $N_i^7$. The regions $N_i^7$ are specifically referred to herein as "local regions" and are distinct from the previously described regions in that only the WM and GM voxels therein are considered.

The Otsu method is determined, for each boundary GM voxel under consideration, on the respective local region, and equation 2 is likewise minimized on the same local region. The additional constraints are also defined relative to the regions $N_i^5$ and $N_i^3$ as follows: there should be at least $c^3_{WM}$ WM voxels in a region $N_i^3$, and at least $c^5_{WM}$ WM voxels and at least $c^5_{GM}$ GM voxels in a region $N_i^5$. Preferably, the values of $c^3_{WM}$, $c^5_{WM}$, and $c^5_{GM}$ are 4, 20, and 20, respectively.

Preferably according to the invention, the boundary GM voxel under consideration is flipped from GM to WM if the intensity value exceeds (or is equal to) the threshold $t_{GM\text{-}WM\ absolute}$, and the additional constraints are also satisfied. If any of the additional constraints is not satisfied, the voxel is preferably not flipped on the assumption that it is too isolated for processing.

When the $GM_{1-M}$ are processed as described above, assuming any are flipped to WM, a new boundary will result. The same processing is then preferably performed on the GM voxels along the new boundary, and the processing is preferably repeated on the GM pixels in successive new boundaries in this manner for sixteen iterations.

The GM growing stage 2 of the adaptive thresholding methodology, being preferably performed after stage 1, potentially flips WM voxels under consideration back to GM. Stage 2 is performed according to the methodology of stage 1, with the following exceptions: (1) the absolute threshold (in this case $t_{WM\text{-}GM\ absolute}$) is preferably chosen as the maximum of $t_1$ and $t_2$; (2) none of the aforementioned "additional constraints" are invoked; (3) the WM voxels under consideration are flipped to GM if their intensities are less than (or equal to) the threshold; and (4) only one iteration is preferably employed.

FIGS. 9 and 10 show algorithms for implementing the preferred stage 1 and stage 2 processes in the computer 14 of the system 10.

It is to be understood that, while specific image segmentation methods have been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A method for efficient searching for optimal relative thresholds for use in identifying structures depicted in an image comprising voxels representing at least three different structure types A, B, and C, wherein a voxel representing structure type A is presumed to have a greater intensity associated therewith than an adjacent voxel representing structure type B, and wherein a voxel representing structure type B is presumed to have a greater intensity associated therewith than an adjacent voxel representing structure type C, the method comprising:

specifying a plurality of candidate B-A criteria by which a comparison of the intensity associated with said first voxel with an intensity associated with a second voxel is to be considered to indicate that the first voxel represents structure type B assuming the second voxel represents structure type A;

performing the following steps (a)-(d) with each of said candidate B-A criteria to obtain corresponding threshold-search voxels that are at least temporarily classified as representing structure type B:
(a) selecting a first voxel to be classified as being either structure type A or B, said first voxel having an intensity associated therewith,
(b) determining a B-A path of voxels passing through said first voxel,
(c) defining a B-A maximum distance along said B-A path that is substantially less than the maximum distance allowed by the image, and
(d) determining whether there is a second voxel on said B-A path, within said B-A maximum distance of said first voxel, such that the intensities associated with said first and second voxels together satisfy said B-A criteria, and if so, the method further comprises at least temporarily classifying said first voxel as representing structure type B;

defining C-A criteria by which a comparison of the intensity associated with a third voxel with an intensity associated with a fourth voxel is to be considered to indicate that the third voxel represents structure type C assuming the fourth voxel represents structure type A;

performing the following steps (e)-(i) for each of said C-A criteria:
(e) determining a C-A path of voxels passing through said third voxel,
(f) defining a C-A maximum distance along said C-A path that is substantially less than the maximum distance allowed by the image,
(g) identifying a set of one or more of said threshold-search voxels, on said C-A path within said C-A maximum distance of said third voxel, the voxels of said set having respective intensities associated therewith,
(h) determining a set of comparative values, each comparative value indicating a comparison of the intensity associated with a respective one of the voxels of said set of threshold-search voxels with the intensity associated with said fourth voxel, and
(i) determining an average relative intensity that is, at least in part, based on the average of said comparative values;

forming a plurality of lists of said threshold-search voxels, each list corresponding to a unique predetermined range of the average relative intensities obtained in steps (i);

defining an objective function for the structure types A, B, and C; and re-classifying the voxels in said lists from structure type B to structure type C so as to lower the value of said objective function.

2. The method of claim 1, further comprising, according to said B-A criteria, comparing the intensity associated with said first voxel to the intensity associated with said second voxel so as to define a B-A relative intensity, comparing an assumed intensity for voxels representing structure type A to an assumed intensity for voxels representing structure type B so as to define a B-A relative threshold, wherein said B-A criteria are satisfied if said B-A relative intensity is less than said B-A relative threshold, and, according to said C-A criteria, comparing the intensity associated with said third voxel to said average relative intensity so as to define a C-A relative intensity, and comparing an assumed intensity for voxels representing structure type A to an assumed intensity for voxels representing structure type C so as to define a C-A relative threshold, wherein said C-A criteria are satisfied if said C-A relative intensity is less than said C-A relative threshold.

3. The method of claim 2, wherein said objective function is defined, at least in part, by a weighted sum of intra-class variations.

4. The method of claim 1, wherein said objective function is defined, at least in part, by a weighted sum of intra-class variations.

5. A method for identifying structures depicted in an image comprising voxels representing two different structure types A and B, a voxel representing structure type A being presumed to have a greater intensity associated therewith than an adjacent voxel representing structure type B, the method comprising:

(a) identifying a B voxel currently recognized as representing the structure type B that is adjacent an A voxel currently recognized as representing the structure type A;

(b) defining a first local region of voxels surrounding said B voxel;

(c) determining an A-B threshold first candidate value that decreases, on said local region, the value of an objective function that is defined, at least in part, by a weighted sum of intra-class variations; and (d) at least tentatively recognizing the B voxel as an A voxel if the intensity of the B voxel is greater than said first candidate value;

wherein step (c) further comprises determining an A-B threshold second candidate value determined on said first local region by an Otsu threshold generation method; and wherein the recognition of step (d) is conditioned on the first candidate value being less than the second candidate value, otherwise the method comprises recognizing the A voxel as a B voxel if the intensity of the A voxel is greater than said second candidate value.

6. The method of claim 5, further comprising defining a first limited region of voxels surrounding said B voxel, and wherein step (d) further requires, for said recognizing, that the number of A voxels in said first region exceed a predetermined minimum.

7. The method of claim 6, wherein said first limited region is smaller than said first local region, and wherein step (d) further requires, for said recognizing, that the number of B voxels in said first limited region exceeds a predetermined minimum.

8. The method of claim 7, further comprising defining a second limited region of voxels surrounding said B voxel, wherein said second limited region is smaller than said first limited region, and wherein step (d) further requires, for said recognizing, that the number of A voxels in said second limited region exceeds a predetermined minimum.

9. The method of claim 8, iterated at least 10 times.

10. The method of claim 7, iterated at least 10 times.

11. The method of claim 6, iterated at least 10 times.

12. The method of claim 5, wherein said A and B voxels define a portion of a first boundary between voxels that were recognized as representing structure type A and voxels that were recognized as representing structure type B, and wherein, if as a result of step (d), said B voxel becomes currently recognized as an A voxel, so that said first boundary is transformed into a second boundary that is displaced at least in part from said first boundary, the method further comprises:

(e) identifying an A voxel adjacent said second boundary that is currently recognized as representing the structure type A;

(f) defining a second local region of voxels surrounding said A voxel;

(g) determining a B-A threshold first candidate value that decreases, on said second local region, the value of an objective function that is defined, at least in part, by a weighted sum of intra-class variations; and (h) at least tentatively recognizing the A voxel as a B voxel if the intensity of the A voxel is less than said first candidate value.

13. The method of claim 12, wherein step (g) further comprises determining a B-A threshold second candidate value determined on said second local region by an Otsu threshold generation method, and wherein the recognition of step (h) is conditioned on the first candidate value being greater than the second candidate value, otherwise step (h) comprises recognizing the A voxel as a B voxel if the intensity of the A voxel is less than said second candidate value.

14. The method of claim 13, wherein steps (e)-(h) are performed only after steps (a)-(d) are iterated at least 10 times.

15. The method of claim 5, iterated at least 10 times.

* * * * *